United States Patent [19]

Fuentes

[11] Patent Number: 5,440,613
[45] Date of Patent: Aug. 8, 1995

[54] ARCHITECTURE FOR A CELLULAR WIRELESS TELECOMMUNICATION SYSTEM

[75] Inventor: James J. Fuentes, South Barrington, Ill.

[73] Assignee: AT&T Corp., Murray Hill, N.J.

[21] Appl. No.: 281,249

[22] Filed: Jul. 27, 1994

Related U.S. Application Data

[63] Continuation of Ser. No. 998,310, Dec. 30, 1992, abandoned.

[51] Int. Cl.$^6$ .............................................. H04Q 7/24
[52] U.S. Cl. ........................................ 379/60; 379/59; 455/33.2; 370/110.1
[58] Field of Search ............................. 379/59, 60, 63; 455/33.1, 33.2; 370/110.1

[56] References Cited

U.S. PATENT DOCUMENTS

| 4,245,538 | 12/1980 | Ito et al. | |
| 4,599,490 | 7/1986 | Cornell et al. | |
| 4,811,380 | 3/1989 | Spear | 379/60 |
| 4,827,499 | 5/1989 | Warty et al. | |
| 5,090,050 | 2/1992 | Heffernan | 379/60 |
| 5,117,502 | 5/1992 | Onoda et al. | 379/60 |

OTHER PUBLICATIONS

Commutation & Transmission article, "PAN-European Digital Cellular System for Mobile Telephones", Duplessis et al., No. 2, 1986, pp. 5-14.
Ultraphone 100 Wireless Digital Loop Carrier TM, System Description, International Mobile Machines Corporation, 1987, pp. 1.1-5.3.
V. Breton et al., "Tangara: digital cordless telephone system", Commutation Et Transmission, vol. 13, No. 3, 1991, Paris, pp. 23-32.

Primary Examiner—Curtis Kuntz
Assistant Examiner—Dwayne D. Bost
Attorney, Agent, or Firm—Werner Ulrich

[57] ABSTRACT

This invention relates to a method and apparatus for offering wireless telecommunication service. A switch such as an automatic Private Branch Exchange (PBX), equipped to communicate with Integrated Services Digital Network (ISDN) station sends ISDN signaling messages to and receives ISDN signaling messages from a protocol converter. The protocol converter, which also communicates with a wireless cell site, converts messages between the ISDN protocol and a protocol for communicating with the wireless cell site. The cell site sets up wireless connections to a mobile station, essentially in its prior art mode, and the PBX sets up connections to the cell site essentially in its prior art ISDN station control mode. The system can also hand off calls from one cell site to another connected to the same PBX, using the protocol converter to generate and distribute the locate request messages. The system can further process roamers by allowing them to register locally and by directly connecting intra-system traffic to such roamers.

10 Claims, 5 Drawing Sheets

WIRELESS ORIGINATED CALL

HAND-OFF

ROAMING

ARCHITECTURE FOR A CELLULAR WIRELESS TELECOMMUNICATION SYSTEM

This application is a continuation of application Ser. No. 07/998,310, filed on Dec. 30, 1992, abandoned.

CROSS-REFERENCE TO RELATED APPLICATION

This application relates to an application by James J. Fuentes entitled "Architecture For A Wireless Telecommunication System", filed Aug. 11, 1992, Ser. No. 928,386, and assigned to the same assignee as this application.

TECHNICAL FIELD

This invention relates to wireless telecommunication systems and, more specifically, to architecture for small growable cellular wireless telecommunication networks.

PROBLEM

Wireless telecommunication networks have grown very rapidly in the past decade as a result of substantial breakthroughs in the cost of wireless telecommunication terminals, otherwise known as mobile stations. Such mobile stations exist in many forms from those which are mounted in automobiles to portable stations to hand held stations. The cellular principle has permitted a large growth in the amount of wireless telecommunications which can be carded over the allocated radio spectrum thus allowing a huge growth in the number of wireless telecommunication subscribers.

While major cost breakthroughs have taken place in the customer equipment (the radio transceivers for communicating with the cellular systems), a similar cost breakthrough has not taken place in the central office equipment required to establish connections between customer stations. In particular, while large systems have been designed whose per subscriber cost is not high, a small and inexpensive but growable small wireless cellular switching system is not available in the prior art. Such a system is particularly desirable for use in low density cellular areas such as a remote service area.

SOLUTION

The above problem is solved in accordance with this invention wherein a moderate size switching system, such as a midsize private branch exchange (PBX) is used as the mobile telecommunication switching office; in a departure from the prior art, this system is adapted for use in the cellular application by virtue of an architecture which allows the PBX to communicate with the cell sites of the cellular system as if these cell sites were other PBXs communicating, via a system using out of band signaling, referred to hereinafter as out of band telephone station control (OTSC), such as that used in integrated services digital network (ISDN) communication links, wherein the out of band signaling communicates with a protocol converter to convert between ISDN and cell site protocols. In accordance with this invention, the system is equipped for autonomous registration and for handoff so that customers can move within one cell from areas covered by one directional antenna to areas covered by another directional antenna and can move from cell to cell. In one embodiment, outside customers (roamers) can autonomously register and make calls within and outside the cellular communication system and receive calls from outside that system. In one embodiment, the cell sites, which are existing prior an cell sites, receive data communications from a protocol converter inserted in the data link part of the ISDN connection; the protocol converter converts signals from the PBX from ISDN protocol to a protocol accepted by the cell site and converts cell site data messages in a protocol normally destined for a mobile switch from the cell site protocol to an ISDN protocol. Advantageously, such an arrangement permits the PBX to set up cellular connections in essentially the same way that the PBX is already equipped to set up ISDN connections.

In one specific embodiment of the invention, a primary rate interface (PRI) carrying a plurality of B-channels and one D-channel is used to connect the PBX with a cell site; the protocol converter in this case converts messages on the D-channel. A plurality of primary rate interfaces may share a single D-channel on one of these interfaces. Advantageously, the protocol converter need only communicate with a small number of data channels. Advantageously, the development effort is minimized because existing PBXs, cell sites, and ISDN and cell site protocols are used, so that only software for the protocol converter needs to be developed.

In one embodiment, the PBX is connected to other PBXs by primary rate interface connections. This permits connections to be set up between stations served by two different PBXs connected by such a primary rate interface. In one specific embodiment of the invention, the PBX is a System 75 Definity ® PBX which is manufactured by AT&T. Such a system is adapted to interface with other PBXs via primary rate interface ISDN communication links. Advantageously, the use of such a system avoids the need for reprogramming a PBX to accomplish the objectives of the invention.

In accordance with another specific embodiment of applicant's invention, land-based customer lines are also connectable to the PBX. Advantageously, the PBX can then serve both land-based and mobile stations.

Growth for such a system is straightforward. First, the capacity of the cell site is increased to its maximum. Then, additional cell sites are added under the control of one PBX. Then, another PBX may be added, along with its cell sites. Finally, an Autoplex ® 1000 system such as that described in U.S. Pat. No. 4,827,499 can be formed by adding a control processing complex to control the PBXs and the cell sites, or the PBXs may be replaced by a mobile communications telecommunication switch which can communicate directly with the cell sites without using a protocol converter.

DETAILED DESCRIPTION

Figure 1:
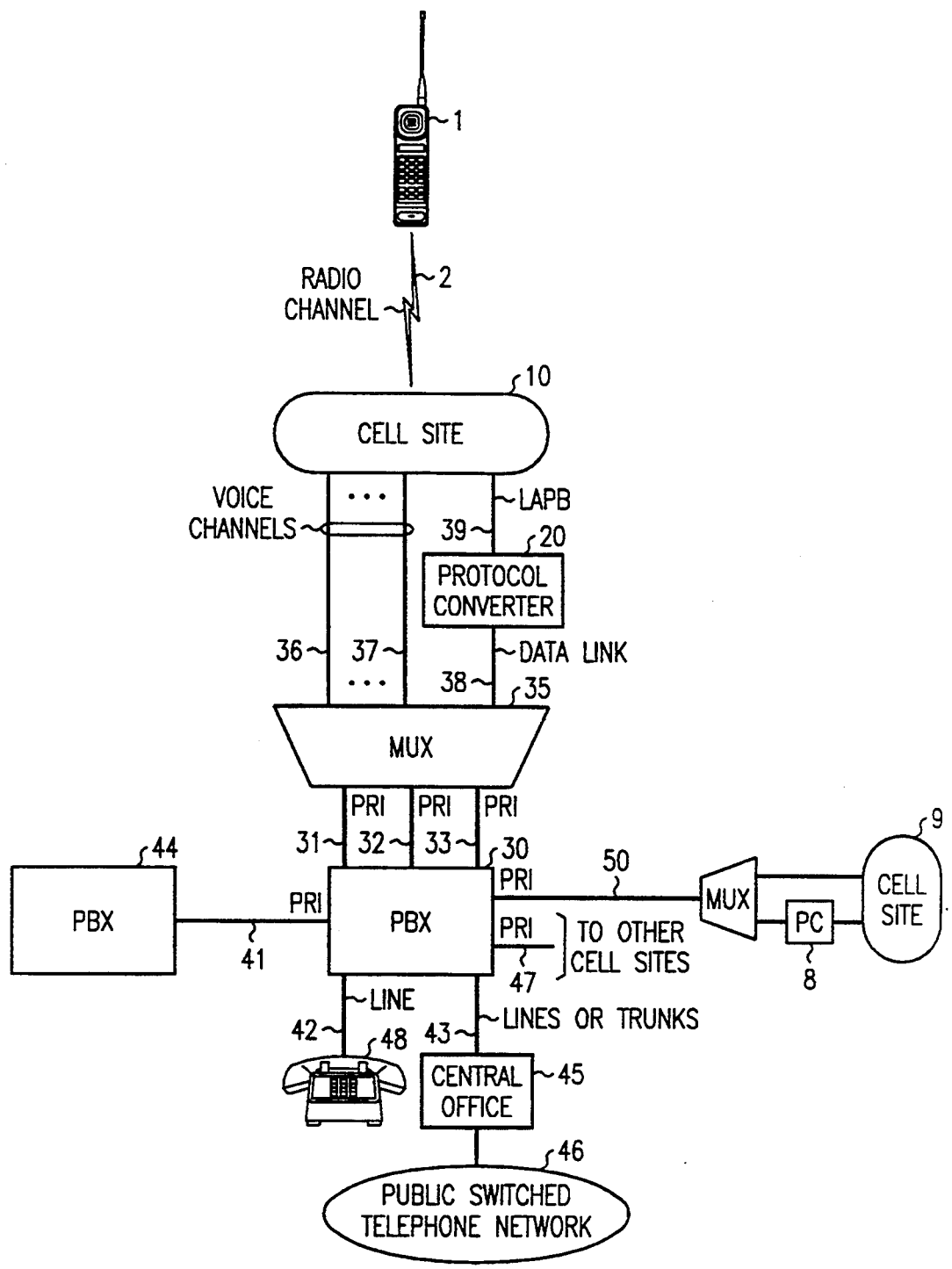
FIG. 1 is a block diagram illustrating the operation of the invention.

FIG. 1 is a block diagram illustrating the operation of applicant's invention. A radio cell site 10 communicates via radio channel 2 with a mobile station 1. A cell site such as the Autoplex ® Series I Mod II Cell Site can be used in this application. A different cell site can be used if the European Global Systems for Mobile Communications (GSM) standard protocol is required. The cell site is connected by a multiplexer 35 to one or more primary rate interface integrated services digital network (PRI-ISDN) communication channels 31, 32, 33 to a private branch exchange (PBX) 30. The multiplexer 35 strips the D-channel from the PRI signals and sends these D-channel signals via data link 38 to protocol converter 20 connected via data link 39 to cell site 10. A multiplexer such as the Crossnet 442 multiplexer manufactured by Tellabs can be used. A NCR 3330 (Intel 486 based) computer manufactured by NCR Inc. can be used as the protocol converter (PC); the NCR computer is equipped with an interface board such as a DLPI/HDLC Controller Board for UNIX ® systems to terminate the two data links to the PC. Cell site 10 receives its control signals over the data link 39 and transmits its responses and its own initiated data messages over that link. The protocol converter converts between ISDN control messages specified in the CCITT Q.931 call control message set and the message set required to interface with a cell site. This message set may be proprietary or it may conform with a standard such as that specified in the European GSM standard for wireless communications.

PBX 30 is also connected by lines such as line 42 to land based telephone stations such as station 48; by one or more PRI facilities 41 to one or more other PBXs 44, the latter being for connection to the other cell sites; by one or more PRI facilities 47 to one or more other cell sites connected to PBX 30; and by facilities such as lines or trunks 43 to a class 5 central office switch 45, the latter being for connection to to a public switched telephone network for accessing of telephones and mobile stations outside the immediate region covered by PBXs 30 and 44 and central office 45. The connection to the class 5 central office can be over line facilities, one or more PRI facilities, or even T-carrier trunk facilities; a line interface is the most natural for communicating between a PBX and a central office, especially an older central office, and simplifies the process of billing at the central office.

The PBX keeps track of the busy-idle state of all mobile stations currently associated with a cell site. When a disconnect is received, the B-channel is made available through a release message from the PC; this makes the B-channel, and its associated radio channel, available, and changes the busy-idle state of the mobile station to idle.

Figure 2:
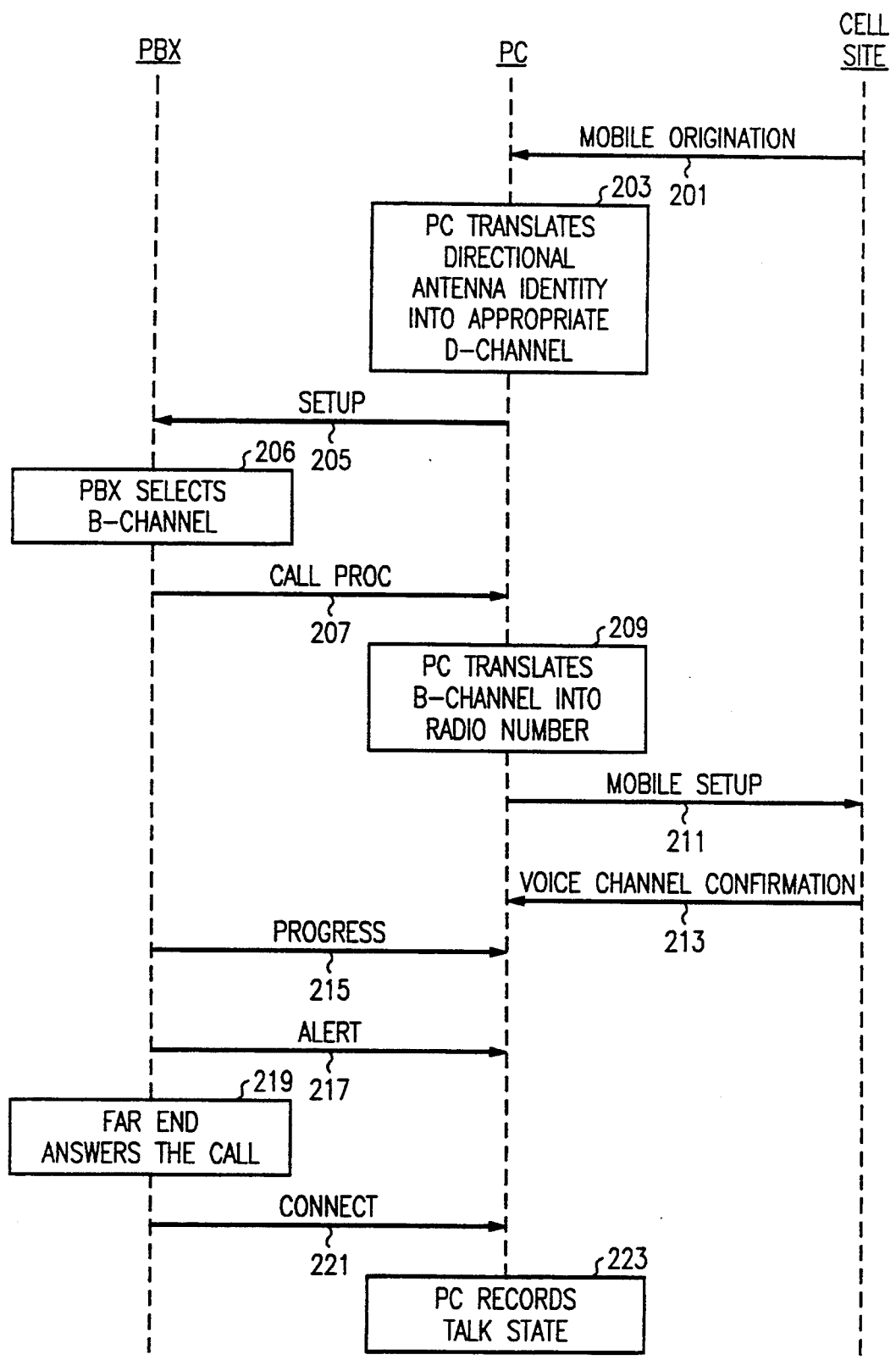
FIGS. 2 and 3 are flow and message diagrams illustrating the steps of establishing an incoming and an outgoing call.

FIG. 2 illustrates the messages and the actions performed by the protocol converter 20 in setting up a wireless originated call. The cell site 10 receives an indication from the mobile station 1 that the mobile station wishes to originate and receives the number of the called customer dialed by the originating mobile station. Cell site 10 sends message 201 to PC 20, the message containing an identification of the calling main station, the called number, and an indication of which directional antenna is optimum for use on this call. The mobile station picks the set-up channel that corresponds to the optimum directional antenna. The protocol converter 20 translates the directional antenna identity into the appropriate D-channel 39 for use in communicating with the PBX 30. If one D-channel serves all of the PRIs connecting the PBX to the cell site, this translation is not required. The PC then transmits a set-up message 205, including the called directory number and an identity of the caller, to PBX 30. As shown in action box 206 PBX 30 then selects a B-channel appropriate for use with the identified directional antenna and transmits over D-channel 38 a call proceed message 207 identifying the selected B-channel. In action block 209, PC 20 translates the B-channel identity into a radio number and transmits a mobile set-up message 211 to the cell site to establish communication between the selected B-channel and the mobile station 1. The cell site 10 having confirmed the establishment of such a radio communication then returns to the protocol converter 20 a voice channel confirmation message 213.

In the meantime, PBX 30 has been establishing the other end of the connection and transmits a series of call progress messages 215 to PC 20 which maintains track of the status of the connection. When the connection has been established, an alert message 217 is sent from PBX 30 to PC 20 indicating that the called customer is being alerted. The calling customer hears audible tone. The PBX 30 then detects that the call has been answered (action block 219) and transmits a connect message 221 to the PC 20. In response, the PC 20 records that the connection is now in the talk state (action block 223).

Figure 3:
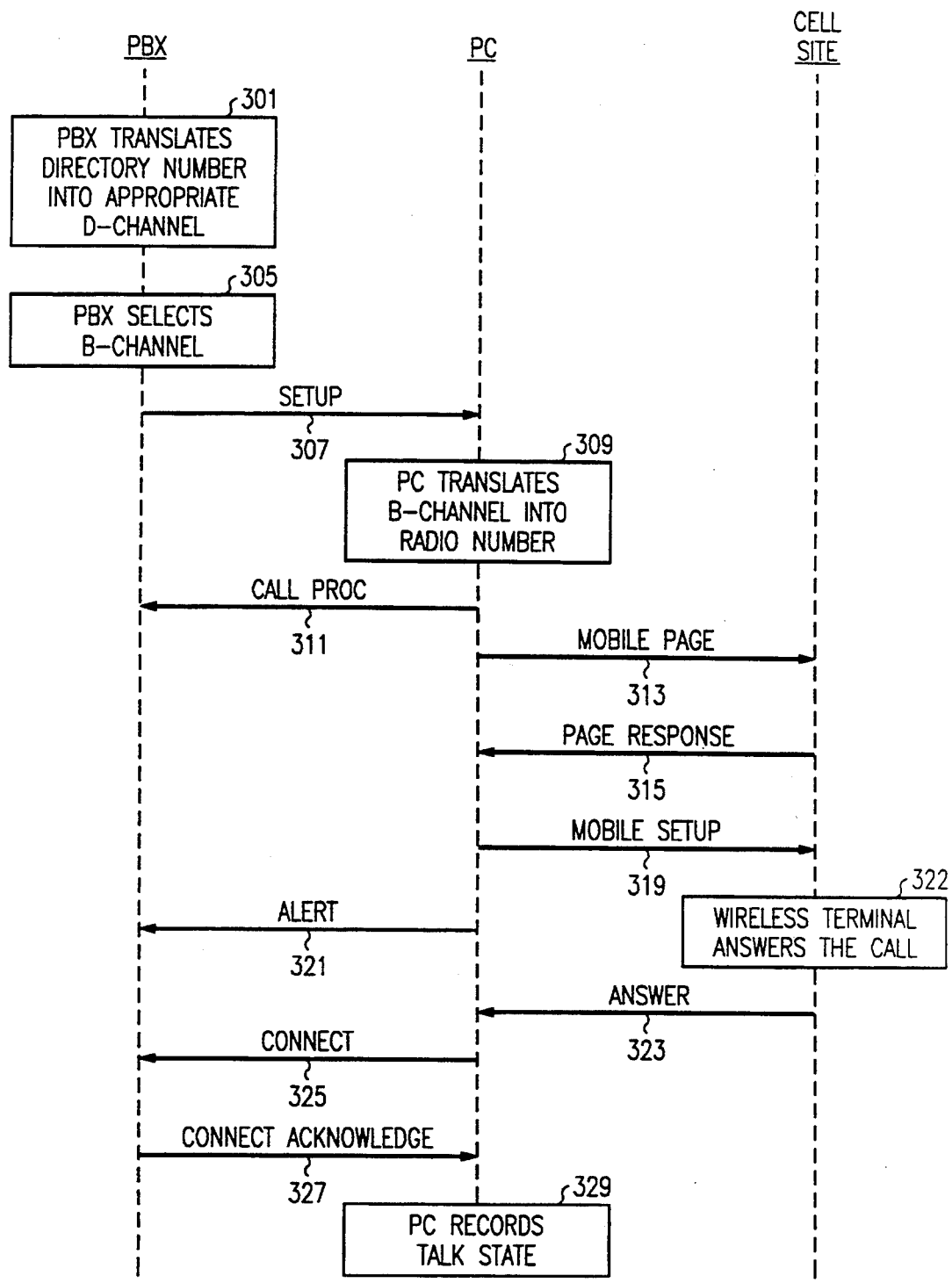

FIG. 3 illustrates a wireless terminated call. Action block 301 indicates that the PBX has received an incoming or an originating call. The PBX translates the directory number into the appropriate D-channel for use in communicating with the protocol converter (action block 303). The PBX then selects a B-channel to be used for this conversation (action block 305). In this embodiment, each PRI can serve only one cell site sector, but several PRIs may serve one sector. The PBX then sends a set-up message including the identity of the called main station and the identity of the B-channel to be used for the connection (message 307). The PC 20 translates this B-channel number into a radio number (action block 309) and transmits, in response, a call process proceeding message 311 back to the PBX. The PC 20 then transmits a request to page the mobile via message 313 transmitted over data channel 39 to cell site 10. Cell site 10 pages the mobile and if the mobile responds properly, transmits a page response message 315 back to PC 20. The PC then sends a mobile set-up message 319 to the cell site requesting that the connection between the selected B-channel and the mobile station be established and that that connection be monitored to determine whether the called mobile station answers the call. The PC also sends an alert message back to the PBX to indicate that the calling party should receive audible ringing tone. When the wireless terminal answers the call (action block 322) an answer message 323 is sent from the cell site to the PC. The PC passes on a connect message 325 to request that the PBX complete the connection to the called customer and remove the audible ringing tone connection. After completing this task, the PBX returns a connect acknowledge message 327 to the PC and the PC records the talking state for that connection (action block 329).

Usually, the PBX is connected to a class 5 central office (end office) or to a tandem or toll switching system in order to allow the wireless customers to access the public switched telephone network. By connecting the PBX to a class 5 central office, it is possible to handle the roaming problem in a very straightforward way. If a roamer enters the area covered by the cell site of the exemplary system, and turns on its radio in order to perform the registration function, well known in the prior art, the cell site transmits information concerning the roamer to a PBX which forwards it to a central office. Additionally, registration can be performed periodically after an initial registration on mobile power turn-on. The central office then initializes the PBX to be able to accept calls from that roamer and notifies a larger wireless systems network of the location of the roamer. Calls are then forwarded from a home switching system to the serving cell site, each cell site being identified by a directory number. Calls to parties not connected to the PBX via either a radio channel or a direct connection are handled by connections from the PBX to the controlling central office. The latter can then establish a connection over public switched telephone network to any destination. Incoming calls can similarly be handled by terminating such calls to the connected central office and completing the connection through a connection to the PBX which makes a connection to a line connected to the PBX directly or via a radio channel.

The central office can be connected to the PBX using any of the standard central office PBX transmission and signaling facilities. The use of a common channel signaling arrangement between the PBX and the central office enhances the flexibility of the system.

Figure 4:
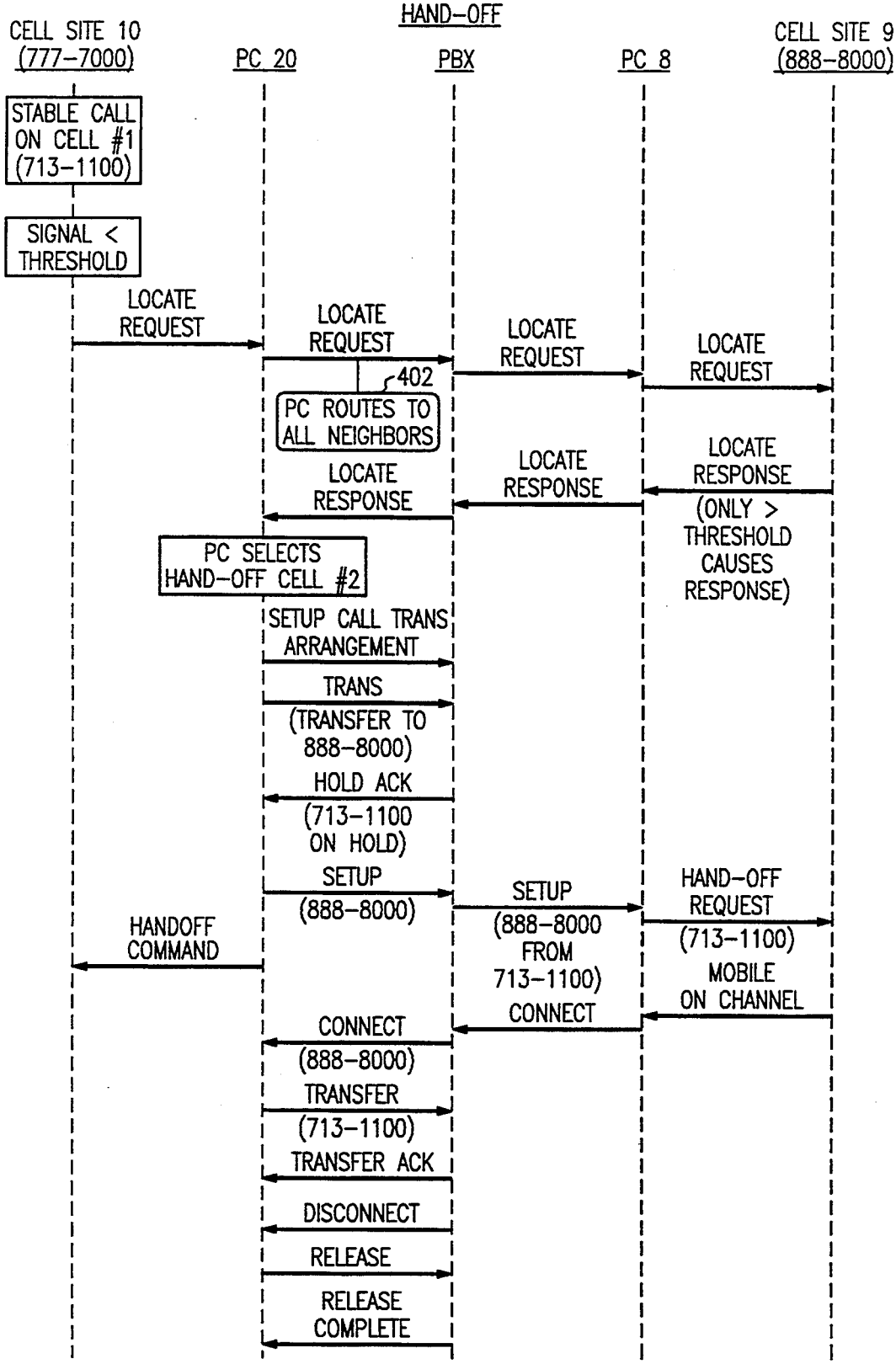
FIG. 4 is a flow and message diagram of a hand-off process.

FIG. 4 is a diagram illustrating the process of handing off wireless communication from one cell site to another. Each directional antenna of each cell site has a directory number. In this case we will illustrate the handoff from the selected antenna of cell site 10 to the selected antenna of cell site 9. Cell site 10 or, if appropriate, its directional antenna, has directory number 777-7000 while cell site 9, or, if appropriate, its directional antenna, has directory number 888-8000. The mobile phone has a directory number 713-1100. Cell site 10 recognizes that the strength of the radio signal from mobile 713-1100 (i.e., mobile 1) has dropped below an upper threshold suggesting that a handoff is desirable. Cell site 10 sends a message to neighboring cell sites requesting a signal strength measurement for the specified mobile unit. This message, a locate message, identifies the radio channel on which the mobile station 1 is currently transmitting.

In this preferred embodiment, the locate message is sent to protocol converter 20 as a conventional mobile radio locate message. Protocol converter 20 sends an X.25 message to protocol converters associated with each of the neighboring cell sites (action block 402). The pertinent protocol converter associated with cell site 9, i.e., PC8, receives this message and sends the locate request to cell site 9. In this preferred embodiment, the broadcast capability offered by AT&T's ISDN PRI implementation for X.25 message routing is used to generate multiple sessions for transmitting the locate request message to multiple destinations. The multiple sessions are used to generate the multiple messages to neighboring cell sites. This arrangement, in effect, provides the packet switching required to send messages to all neighboring cell sites.

The locate request messages are distributed as follows. Each protocol converter is connected via an X.25 permanent virtual circuit to all neighbor cells which are potential targets for handover. This facility can easily be implemented using, for example, an AT&T Uniprism card as part of the protocol converter. The cell site signals its connected protocol converter via its LAPB connection (connection 39 for cell site 10). This LAPB message is used by the protocol converter to generate ISDN messages to each of its neighbor cell sites using the X.25 permanent virtual circuits and transmitted over one or more ISDN D-channel links.

Cell site 9 performs the signal strength measurement and sends back a locate response message to its protocol converter, PC8, which forwards this locate response message to the protocol converter 20. Protocol converter 20 receives the measurements from all neighboring cells receiving above threshold signals and selects a cell site which has adequate signal strength.

The final steps of hand-off are performed in accordance with the principles of any conventional hand-off procedure, taking into account the use of the protocol converters, PC 8 and PC 20 to convert between the messages generated or received by the cell sites and the messages generated or received by the PBX or other switching system. In this embodiment, these steps are as indicated in the balance of FIG. 4. Assume, in this case, that the cell site selected for hand-off is cell site 9. Protocol converter 20 sends a request message to PBX 30 to set up a call transfer arrangement between the specified B-channel on which mobile 1 is presently communicating, and a B-channel of the primary rate interface to cell site 9 identified by directory number 888-8000. The call transfer arrangement permits a subsequent new connection to cell site 9 to be made rapidly as soon as the mobile radio has been retuned; such a connection can be readily established using a time division switch. The PBX selects a B-channel (in this case, B-channel 501) in the primary rate interface to cell site 9 and sends a set-up message to cell site 9 via its associated protocol converter. Protocol converter 8 transmits a hand-off request message to cell site 9 requesting that mobile station 1 (identified by directory number 713-1100) currently transmitting on B-channel 500 is to be transferred to a channel of a PRI for accessing the directory number associated with cell site 9. PC 20 sends a set up request to set up to a specific channel 501 of cell site 9. The set-up request is converted by PC 8 to a hand-off request to channel 501. Responsive to an acknowledgment of the hand-off request (not shown), PC 20 sends a hand-off command to cell site 10 to cause mobile station 1 to retune to channel 501. Cell site 9 responds with a confirmation message identifying the mobile and the new channel number (assumed in this case to be channel 501) as soon as the mobile has been retuned and the mobile signal is detected on the new channel. As soon as retuning has been successfully accomplished, an on-hook message is sent from cell 10 with respect to PRI channel B1 to protocol converter 20 and this on-hook message is passed on to PBX 30. PBX 30 then changes the call transfer arrangement to route the call to cell site 9.

Alternatively, a conference connection can be used wherein both cell site 9 and cell site 10 are simultaneously connected to the other party; this allows for a smoother transition, but is more expensive.

While in this particular implementation a PBX is used for controlling the handoffs, in other implementations a central office, such as central office 45, can be used. Note further that another PBX, such as PBX 44, can be connected to PBX 30 through one or more primary rate interfaces and PBX 44 can be connected to target handover cell sites. In this case, messages between protocol converters and their associated PBXs must also be passed to the other PBX for transmission to their associated protocol converters whenever a target cell site is connected to another PBX.

In order to ensure that the proper party is billed for transferred calls, reverse charging is used on all transferred calls to associate the charge with the directory number of the mobile station and not the directory number of the handoff cell site.

Figure 5:
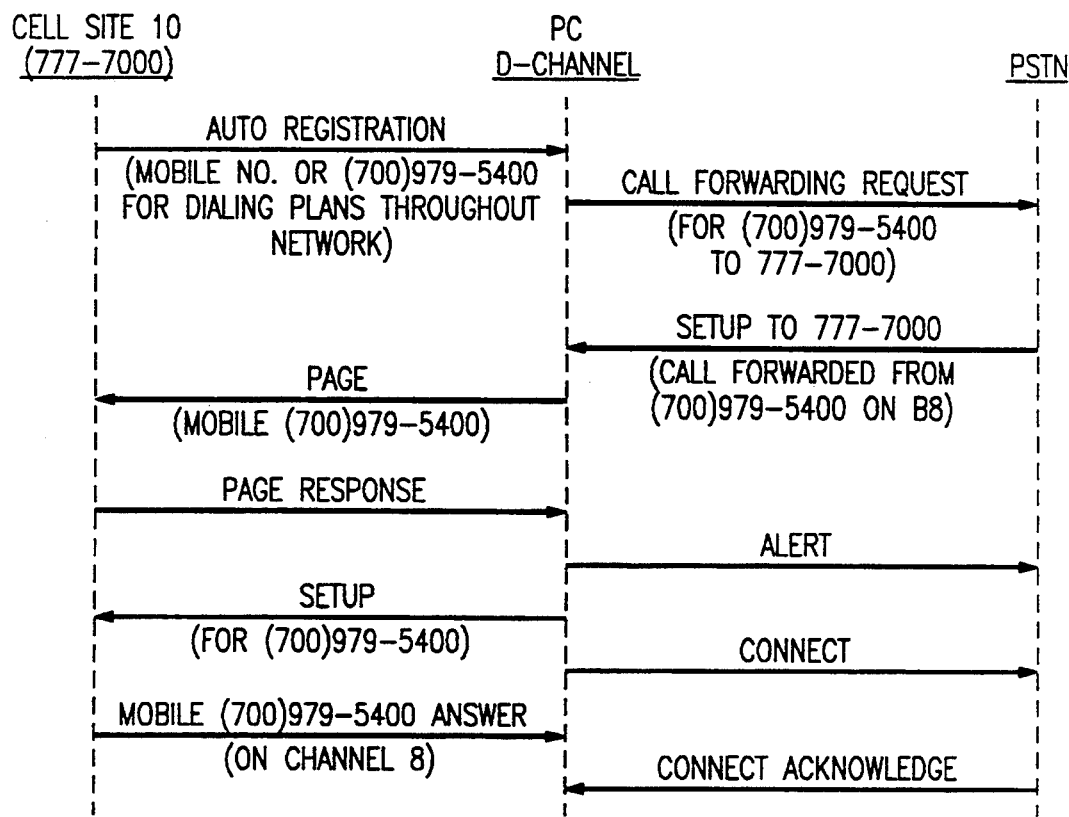
FIG. 5 is a flow and message diagram of treatment of a roamer.

FIG. 5 illustrates the process of registering roamers and handling calls for such mobile units. In this particular case, the roamer has a directory number of 700-979-5400. The 700 identifies the mobile station as a roamer. When a registration request is originally received from a mobile station (this happens when the mobile station turns on its power) an auto registration request is passed from cell site 10 to its associated protocol converter 20. The protocol converter checks whether the mobile is already registered in that cell site and if not, sends a message to PBX 30 that all calls for 700-979-5400 should be forwarded to 777-7000, the directory number of cell site 10. In addition, the PBX checks to see if 700-979-5400 is on its roamer list and if not, sends a message to a centralized 700 data base to verify that roamer 700-979-5400 is a valid roamer number to which service may be provided at this time and to inform a centralized 700 data base of the present location (the directory number of the cell site) of the roamer. PBX 30 sends a validation message to protocol converter 20 in response to which protocol converter registers the mobile. The validation message includes the serial number of the mobile.

In response to an incoming call from the public switched telephone network, the call having been forwarded with the aid of the 700 data base, such a call is received in the PBX 30. PBX 30 sends a set-up message to cell site 10 (directory number 777-7000) to forward the call for 700-979-5400 and identifies the B-channel being used for that message as B-channel 8. Protocol converter 20 sends a page request message to cell site 10 to page mobile 700-979-5400. The serial number of the mobile station (which was previously recorded in response to the registration) is sent as part of the page message. The page response is returned to protocol converter 20 which sends an alert message to PBX 30 to cause the PBX to return audible tone to the caller, and a set-up message for mobile 700-979-5400 to cell site 10. When the mobile answers, an answer message is sent from the cell site to the protocol converter 20 which transmits a connect message to PBX 30 which completes the connection and sends a connect acknowledge message back to protocol converter 20.

The public switched telephone network forwards outside calls to the roamer by consulting the centralized 700 data base, used for roamers and customers having "Follow Me" service, whenever there is a call to that roamer. Calls from the public switched network are then simply forwarded to the roamer. Calls from one of the cell sites served by the PBX are directly connected to the roamer, since the roamer has been registered in that PBX.

Growth for such a system is straightforward. First, the capacity of the cell site is increased to its maximum. Then, additional cell sites are added under the control of one PBX. Then, another PBX may be added, along with its cell sites. Finally, an Autoplex 1000 system such as that described in U.S. Pat. No. 4,827,499 can be formed by adding a control processing complex to control the PBXs and the cell sites, or the PBXs may be replaced by a mobile communications telecommunication switch which can communicate directly with the cell sites without using a protocol converter.

An advantage of this system is the relatively simple functionality required at the PBX. As it becomes easier to provide advanced functionality at the PBX, this PBX can be enhanced to control handoffs using essentially the same methods that are already well known in the prior art.

This particular embodiment has illustrated ISDN protocol and an ISDN PRI interface to the PBX. The advantage is that the PBX can then interface with the PC and the cell site as if these were ordinary connections to the PBX. Any other arrangement which allows out of band signaling for controlling telephone stations to be conveniently terminated on the PBX would also meet this requirement.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A wireless telecommunications system for handing off calls from one to another of a plurality of cell sites, comprising:

a telecommunications switching system conventionally adapted to communicate only with land based stations and land based switching systems;

a plurality of wireless cell sites arranged for communicating with a mobile switching center;

protocol conversion means for converting between a cell site control protocol, said cell site control protocol for signaling to and receiving signals from a wireless cell site, and an out of band telephone station control (OTSC) protocol for communicating between a telecommunications switching system and a land based telephone station;

wherein said telecommunications switching system is connected to each of said plurality of wireless cell sites by a plurality of communication links, and said telecommunications switching system is connected to each of said plurality of wireless cell sites by data link means via said protocol conversion means;

wherein said telecommunications switching system sends OTSC protocol signaling messages of a type used for controlling land-based telephone stations to said protocol conversion means as if it were communicating directly with a land based telephone station, and said protocol conversion means converts said OTSC protocol signaling messages to equivalent cell site control protocol messages for transmission to a cell site, for controlling said cell site;

wherein said cell site sends cell site control protocol signaling messages of a type used for communicating with a mobile switching center to said protocol conversion means as if it were communicating directly with a mobile switching center for communicating with cell sites, and said protocol conversion means converts said cell site control protocol signaling messages to equivalent OTSC protocol signaling messages for transmission to said telecommunications switching system;

wherein one of said wireless cell sites sends locate request messages to a plurality of said plurality of wireless cell sites via said protocol conversion means and wherein said protocol conversion means receives locate response messages from said plurality of said plurality of wireless cell sites for selection of a handoff cell site by either of said protocol conversion means or the cell site which transmitted the locate request.

2. The system of claim 1 wherein said protocol conversion means generates a plurality of locate request messages for querying said plurality of wireless cell sites.

3. The system of claim 1 wherein said OTSC protocol is an Integrated Services Digital Network (ISDN) protocol.

4. The system of claim 1 wherein said telecommunications switching system is a private branch exchange (PBX).

5. A wireless telecommunication system, comprising:
 a telecommunication switching system conventionally adapted to communicate only with land based stations and land based switching systems;
 a wireless cell site arranged for communicating with a mobile switching center, and
 protocol conversion means for converting between a cell site control protocol, said cell site control protocol for signaling to and receiving signals from a wireless cell site, and an out-of-band telephone station control (OTSC) protocol for communicating between a telecommunications switching system and a land based telephone station;
 wherein said telecommunications switching system is connected to said cell site by a plurality of communication links;
 wherein said telecommunications switching system is connected to said cell site by data link means via said protocol conversion means;
 wherein said telecommunications switching system sends OTSC protocol signaling messages of a type used for controlling land-based telephone stations to said protocol conversion means as if it were communicating directly with a land based telephone station, and said protocol conversion means converts said OTSC protocol signaling messages to equivalent cell site control protocol messages for transmission to said cell site, for controlling said cell site;
 wherein said cell site sends cell site control protocol signaling messages of a type used for communicating with a mobile switching center to said protocol conversion means as if it were communicating directly with a mobile switching center for communicating with cell sites, and said protocol conversion means converts said cell site control protocol signaling messages equivalent to OTSC protocol signaling messages for transmission to said telecommunications switching system;
 wherein said cell site sends a registration request to said protocol conversion means for initiating a process to determine whether said registration request represents a roamer;
 wherein, responsive to a determination that said registration request represents a roamer, said protocol initiates a process for conversion means informing a roamer data base of a location of a station that transmitted said registration request.

6. The system of claim 4 wherein said protocol conversion means determines whether said registration request represents a roamer.

7. The system of claim 5 wherein responsive to said registration request, said roamer is registered in said telecommunications switching system and wherein subsequent calls originating in said telecommunications switching system and terminating to said roamer are completed without querying said roamer data base.

8. A wireless telecommunications system for handing off calls from one to another of a plurality of cell sites, comprising:
 a telecommunications switching system conventionally adapted to communicate only with land based stations and land based switching systems;
 a plurality of wireless cell sites arranged for communicating with a mobile switching center; and
 protocol conversion means for converting between a cell site control protocol, said cell site control protocol for signaling to and receiving signals from a wireless cell site, and an out of band telephone station control (OTSC) protocol for communicating between a telecommunications switching system and a land based telephone station;
 wherein said telecommunications switching system is connected to each of said plurality of cell sites by a plurality of communication links, and said telecommunications switching system is connected to each of said plurality of cell sites by data link means via said protocol conversion means;
 wherein said telecommunications switching system sends OTSC protocol signaling messages of a type used for controlling land-based telephone stations to said protocol conversion means as if it were communicating directly with a land based telephone station, and said protocol conversion means converts said OTSC protocol signaling messages to equivalent cell site control protocol messages for transmission to said cell site, for controlling said cell site;
 wherein said cell site sends cell site control protocol signaling messages of a type used for communicating with a mobile switching center to said protocol conversion means as if it were communicating directly with a mobile switching center for communicating with cell sites, and said protocol conversion means converts said cell site control protocol signaling messages to equivalent OTSC protocol signaling messages for transmission to said telecommunications switching system;
 wherein the combination of said cell sites and said protocol conversion means effect a handoff of a call between ones of said cell sites, using OTSC protocol signaling messages for signaling to said telecommunications switching system.

9. The system of claim 8 wherein said OTSC protocol is an Integrated Services Digital Network (ISDN) protocol.

10. The system of claim 8 wherein said telecommunications switching system is a private branch exchange (PBX).

* * * * *